United States Patent

Vitalo

[15] 3,668,317

[45] June 6, 1972

[54] AUTOMATIC PERSONAL SIGNALING SYSTEM

[72] Inventor: Alfred Emanuel Vitalo, Lincroft, N.J.

[73] Assignee: Bell Telephone Laboratories, Incorporated, Murray Hill, N.J.

[22] Filed: May 7, 1970

[21] Appl. No.: 35,402

[52] U.S. Cl. ..........................179/18 BF, 340/311, 179/41 A

[51] Int. Cl. ..........................H04m 3/50

[58] Field of Search ..........................179/18 BE, 18 BF, 27 FG, 41 A; 340/311, 312

[56] References Cited

UNITED STATES PATENTS 3,482,057 12/1969 Abbott et al. ..........................179/27 FG 2,909,607 10/1959 Nilsson et al. ..........................179/18 BE

FOREIGN PATENTS OR APPLICATIONS 680,822 10/1952 Great Britain ..........................179/18 BF 883,825 12/1961 Great Britain ..........................179/18 BF 498,502 1/1939 Great Britain ..........................179/18 BF

*Primary Examiner*—Ralph D. Blakeslee

*Attorney*—R. J. Guenther and Kenneth B. Hamlin

[57] ABSTRACT

Telephone switching system automatic intercept facilities are utilized in combination with radio signal transmission circuitry to provide personal signaling or paging service.

5 Claims, 1 Drawing Figure

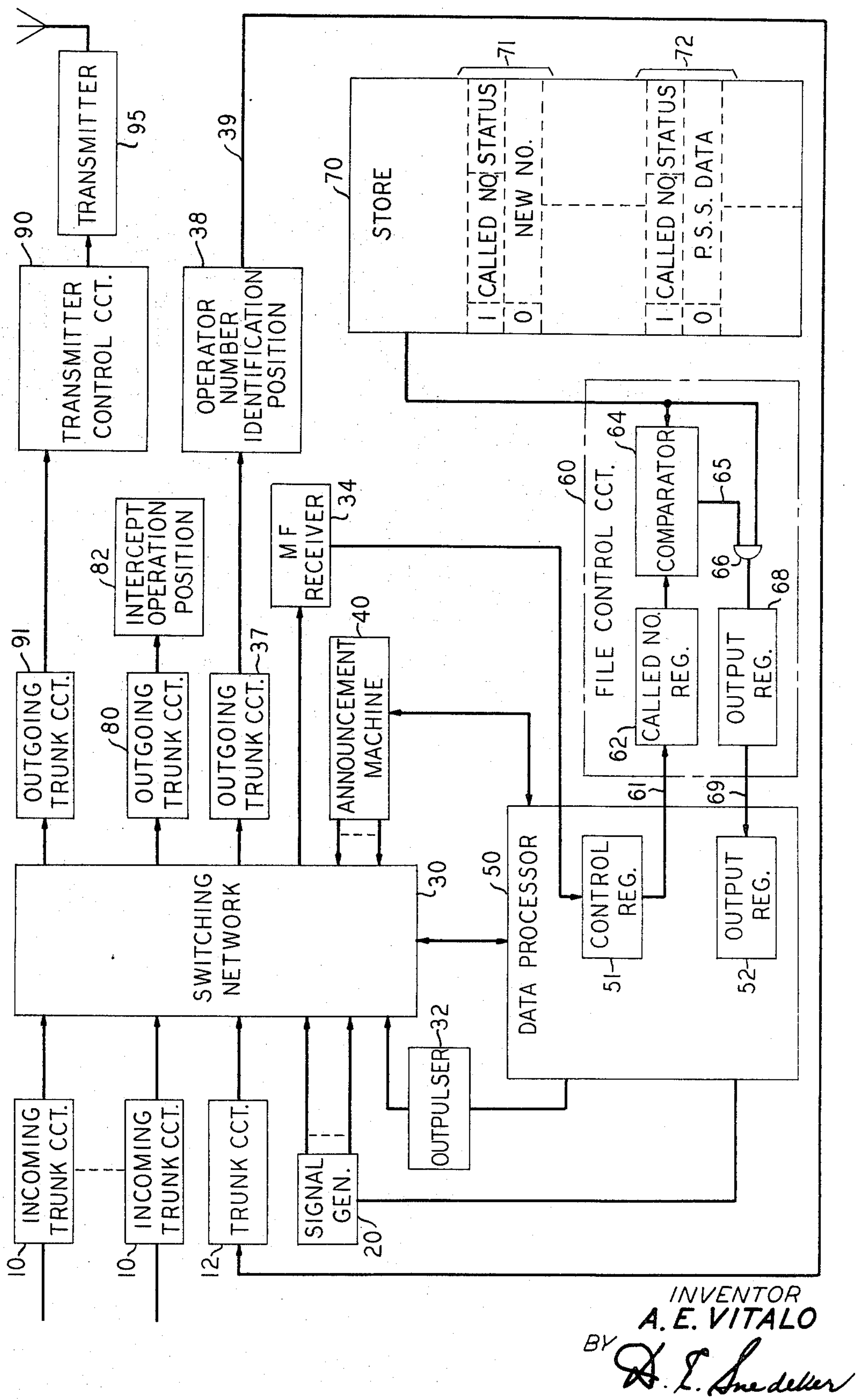
INVENTOR
A. E. VITALO
BY [signature]
ATTORNEY

AUTOMATIC PERSONAL SIGNALING SYSTEM

BACKGROUND OF THE INVENTION

This invention relates to automatic telephone switching systems, and more particularly to providing improved personal signaling service in such systems.

In automatic telephone switching systems it is often desirable to provide a service by which a subscriber located away from his station set can be signaled or paged. For example, a businessman may be away from his office when an important message comes in for him. Since the office staff may not know his exact location, considerable time could be lost in attempting to locate him. If, however, the businessman is provided with a personal signaling device, such as a small receiver suitable for carrying in his pocket, his office staff would need only call a preassigned personal signaling service telephone number to cause a signal to be transmitted automatically to the device carried by the businessman, thereby alerting him to the waiting message at his office.

Various arrangements are currently known for providing personal signaling or paging service to subscribers, such as the BELLBOY personal signaling system described in the Bell Laboratories Record, Volume 2, No. 8 (September 1964). Though generally satisfactory, these arrangements suffer from various disadvantages related to installation and rearrangement costs, limited capacity, and lack of flexibility. For example, known telephone system arrangements are limited in the telephone numbers that can be assigned to personal signaling service. Such arrangements also are generally feasible only in the larger central office locations, utilizing tandem switching features based on dedicated service codes.

SUMMARY OF THE INVENTION

Accordingly, it is a general object of this invention to improve personal signaling service and to alleviate the disadvantages of known arrangements.

More particularly, it is an object of this invention to provide a simple and economical arrangement for providing large capacity personal signaling service.

In accordance with known arrangements, such as the BELLBOY system, dedicated registration, translation and checking circuitry must be provided for personal signaling service purposes. This is clearly uneconomical in many office locations in view of the small percentage of personal signaling service customers that might exist at any one time. It is, therefore, another object of the present invention to make greater use of existing equipment at the various telephone offices to provide personal signaling service without requiring separate and additional translation, registration and checking circuitry therefor.

The above and other objects are attained in an illustrative embodiment of the present invention wherein improved personal signaling service is provided through the advantageous utilization of the equipment provided at the telephone office for intercept purposes. This intercept equipment normally functions only on calls to nonworking telephone numbers for providing a suitable audio announcement to the calling customer. Heretofore, this equipment has served no function with regard to other types of calls. However, in accordance with a feature of the present invention, the intercept equipment is arranged in conjunction with signal transmission circuitry to function both to handle intercept calls to nonworking telephone numbers, and also to handle calls to personal signaling service customers.

Thus the intercept equipment is employed at the local or central office for both intercept and personal signaling service calls, establishing a calling party connection and transmitting the identification of the called number to the intercept processor. For either type of service, the intercept processor searches a data store on the basis of the called number identification and provides a suitable audio announcement to the calling party according to the stored information associated with the particular called number. If the number is arranged for personal signaling service, the announcement informs the calling party that the personal signaling service customer is being signaled and advantageously includes the called number.

The stored information associated with a called number arranged for personal signaling service also includes the unique code and transmission data with which the particular personal signaling customer is signaled. The intercept processor provides this code to the signal transmission circuitry for transmission to the called personal signaling service customer. The transmitted code is received by the signaling device carried by the customer, the device emitting a signal to alert the customer.

In addition to using existing equipment at the telephone office, the present invention advantageously permits any unassigned telephone directory number to be used for personal signaling service. Moreover, any telephone office which has access to intercept equipment can provide personal signaling service to their customers in accordance with the present invention. Another advantage of the present arrangement is that it is free of any restrictions imposed by the transmission circuitry and thus provides an efficient and economical interface between the telephone switching system and a wide variety of paging systems outside the telephone system for providing personal signaling service.

A further aspect of the present invention is that it readily facilitates billing for personal signaling service on a per call basis, if desired instead of the flat rate basis principally used with existing systems. The automatic intercept equipment routinely maintains a count of the number of calls to an intercepted number for reassignment purposes which, in conjunction with periodic readout circuitry, can be employed advantageously for personal signaling service billing purposes. Alternatively, an automatic message accounting recorder can be employed at the intercept center or at the transmitter control location to record the called number or the transmitted code for each completed personal signaling service call.

DETAILED DESCRIPTION OF THE INVENTION

These and other objects and features of the present invention may be better understood upon consideration of the following detailed description and the accompanying drawing which shows an illustrative embodiment of an automatic personal signaling system in accordance with the principles of the present invention.

Typical telephone switching system automatic intercept facilities are shown in block diagram form in the illustrative embodiment of the drawing, the intercept facilities principally comprising switching network 30, announcement machine 40, data processor 50 and store 70. Calls to nonworking telephone numbers are intercepted by the local telephone office equipment in well-known manner and are routed thereby as intercept service requests over incoming trunk circuits 10 to switching network 30. Switching network 30 is controlled by data processor 50 and may comprise either a time division or a space division switching network, depending upon the intercept facilities of the particular telephone switching system. Similarly, data processor 50 may be either a wired logic processor or a programmed processor, both of which are employed in various known telephone switching system intercept facilities. In the description herein, only so much of the details and operation of the intercept facilities are included as may be necessary to a complete understanding of the present invention. Should further description of such intercept facilities be desired, reference may be had to Bell Laboratories Record, Volume 46, No. 5 (May 1968).

The intercept service request from the local telephone office generally includes the identification of the called number, the digits of which are received in multifrequency form by MF receiver 34 and are directed to control register 51 in data processor 50. If the intercept service request does not include the called number identification, such as in situations where the local office is not equipped to identify the called number on intercepted calls, the request is directed through switching network 30 under control of data processor 50 to an operator number identification position 38. The operator at position 38 asks the calling party what number he is calling and then keys the called number over path 39 and trunk circuit 12 to switching network 30. The number is received by MF receiver 34 and is directed to control register 51 in data processor 50. Position 38 is then automatically removed from the connection and the request proceeds as if the called number identification had been received initially with the intercept service request from the local office.

Lists of nonworking telephone numbers are stored in store 70, which may illustratively comprise a content-addressable magnetic disc file, access to which for reading or writing information is under control of file control circuit 60. Each intercept service list record in store 70, such as record 71, includes the called number, its status (changed, disconnected, vacant, etc.) and the new number if one is available, such as in the case of a changed number. As illustratively depicted for record 71 in the drawing, a list record includes two consecutive words in the case of a new number being available, with only a single word of storage being required when a new number is not available. The individual list records are delimited by a head-of-record tag, illustratively a binary "1" bit, at the beginning of the first word of each record. All other list record words, such as the new number words, have a binary "0" tag.

File control circuit 60 controls the retrieval of information from store 70 and the recording of information into store 70. Addressing of store 70 for information retrieval in response to an intercept service request is effected on a content-addressed basis using the called telephone number. Data processor 50 extends the called number registered in control register 51 over path 61 to file control circuit 60 for registration in called number register 62. Upon registration of a called number in register 62, file control circuit 60 sequentially searches the list records in store 70, comparing the called number of each list record with the called number registered in register 62. Upon obtaining a match, comparator 64 enables gate circuit 66 to extend the associated list record information read from store 70 therethrough to output register 68. The information thus extended to register 68 includes the status of the particular called number and the new number therefor if available. This information is directed by file control circuit 60 over path 69 to output register 52 in data processor 50. Data processor 50, in conjunction with announcement machine 40, assembles an audio announcement in accordance with the information in register 52 for return to the calling party.

For this purpose, announcement machine 40 typically comprises a multiple-channel magnetic recorder containing a recorded set of words and phrases, including the digits 0 through 9 recorded with both neutral and descending inflections. These recorded words and phrases cover all announcement sequences that may be required for return to the calling party. The announcement sequence assembled by processor 50 in response to a particular intercept service request is determined according to the status and new number information retrieved from store 70. A typical announcement sequence may be: "The number you have reached, 3681197, has been changed. The new number is 3682793. If you need assistance, please stay on the line and an operator will answer."

If the incoming call must be connected to an intercept operator after the announcement, such as when the calling party stays on the line, processor 50 connects outpulser 32 through switching network 30 over outgoing trunk circuit 80 to an intercept operator position 82. Data processor 50 then places all the information on the intercepted call in outpulser 32, which extends the information over trunk circuit 80 to display apparatus at position 82. Outpulser 32 is then removed from the connection and outgoing trunk circuit 80 is connected through switching network 30 over the appropriate incoming trunk circuit 10 to the calling party so the operator at position 82 can talk to the calling party.

Briefly then, operation of typical automatic intercept facilities in handling an intercepted call to a nonworking telephone number and returning an announcement to the calling party is as follows: data processor 50 periodically scans incoming trunk circuits 10 and when an intercept service request appears on one of trunk circuits 10, switching network 30 is operated to connect the particular incoming trunk circuit 10 to an idle receiver, such as MF receiver 34. Receiver 34 sends a signal back over the incoming trunk circuit to the local office which, responsive thereto, sends the called number identification to receiver 34. Receiver 34 transfers this information to control register 51, whereupon data processor 50 idles receiver 34 and connects the incoming trunk circuit 10 through switching network 30 to announcement machine 40. At the same time processor 50 directs the information in control register 51 over path 61 to called number register 62 in file control circuit 60. File control circuit 60 searches store 70 on the basis of the called number identification and upon finding a match retrieves the associated status and new number information from store 70 and registers it in register 68. The retrieved information in register 68 is directed by file control circuit 60 over path 69 to output register 52 in data processor 50. In accordance with this information, data processor 50 operates announcement machine 40 to return an audio announcement to the calling party.

The present invention contemplates the advantageous utilization of such known intercept facilities in conjunction with signal transmission circuitry to function both to handle intercept service request and, also, to provide personal signaling service. The operation of the intercept facilities in handling an intercepted call to a nonworking telephone number is unchanged from that described briefly above. The manner of gaining access to the intercept facilities and the operation thereof in providing personal signaling service in accordance with the present invention is described in detail below.

Initially, it should be noted that a personal signaling service customer is assigned an available telephone number which, according to the present invention, may be any working telephone number which is not in use. The assigned personal signaling service telephone number is arranged for intercept at the local or central telephone office in the usual manner. Thus, a call to a personal signaling service number is regarded at the telephone office as an intercept call and is extended over an incoming trunk circuit 10 as an intercept service request. The called number identification is included with the service request, or is obtained by operator number identification position 38 in the manner described above, and is registered in control register 51. Upon registering the called number identification, processor 50 connects the calling party through switching network 30 to announcement machine 40.

Up to this point no distinction is made between a call to an intercepted number and a call to a personal signaling service number, each appearing as an intercept service request to the automatic intercept facilities. Responsive to the request in either event, data processor 50 extends the called number identification in control register 51 over path 61 to called number register 62 in file control circuit 60. File control circuit 60 searches store 70 on the basis of the called number and upon finding a match retrieves the associated status and other information from store 70 and registers it in register 68.

The list record in store 70 for a personal signaling service number is advantageously similar to that for an intercept service number. A personal signaling service list record, such as record 72, includes the called number and its status as a first word, the status in this instance indicating that the particular called number is arranged for personal signaling service. The second word of list record 72, instead of containing a new number as for an intercept service list record, includes the personal signaling service data pertinent to the particular telephone number. Specifically, the personal signaling service data includes the unique signaling code associated with the number, along with any information regarding the mode and equipment for transmission thereof to the called personal signaling service customer. For example, in a multiple transmitter area this information would identify the particular transmitter or transmitters to be used.

File control circuit 60 extends the personal signaling service data in register 68 over path 69 to output register 52. Upon registering this information and recognizing the personal signaling service status of the request, data processor 50 operates announcement machine 40 to return an audio announcement to the calling party to inform him that the personal signaling service customer is being signaled. For this purpose additional words or phrases are recorded in announcement machine 40 to cover the announcement sequences for return to the calling party. A typical announcement sequence may be "The personal signaling service number you have reached, 4267110, is being signaled."

At the same time data processor 50, via switching network 30, selects an outgoing trunk circuit 91 and connects signal generator 20 thereover to transmitter control circuit 90. Signal generator 20 is operated by processor 50 in accordance with the personal signaling service data in output register 52. Generator 20 provides the appropriate signaling code to transmitter control circuit 90 for transmission via transmitter 95 to the called customer. The transmitted code is received by a signaling device carried by the customer which alerts him in a predetermined manner.

Signaling of the called customer may be accomplished, for example, by the combining of a plurality of frequencies provided by signal generator 20 in the manner of the above-mentioned BELLBOY system. The combined frequencies are used to frequency modulate a carrier for transmission to the called customer. The particular frequency combination is uniquely associated with the called customer and activates only the device carried by him. For this manner of personal signaling, signal generator 20, transmitter control circuit 90 and transmitter 95 may be substantially similar to the corresponding circuitry presently employed with the BELLBOY system. It will be recognized, however, that other forms of signaling may be used such as sequential frequency combinations or digital codes.

Although only a single transmitter 95 is shown in the illustrative embodiment, typically a plurality of transmitters will be provided to cover the personal signaling service area. The particular transmitter or transmitters used to signal a particular customer will be specified by the personal signaling service data associated in store 70 with the customer's number.

What has been described herein, therefore, is a simple and economical personal signaling system which is operative in conjunction with known intercept facilities to provide personal signal service. It is to be understood, however, that the particular arrangements described above are merely illustrative of the application of the principles of my invention. Numerous other arrangements may be devised by those skilled in the art without departing from the spirit and scope of the invention.

I claim:

1. In a telephone switching system comprising one or more offices including a calling line and a plurality of distinct called directory numbers; an announcement machine; intercept means for intercepting a call from said calling line to a selected one of said called numbers for establishing a connection between said calling line and said announcement machine, said intercept means including means for receiving an intercept service request, said request including said selected called number, store means in which said called directory numbers and manifestations of predetermined signals respectively associated therewith are stored such that the manifestation associated with each of said called numbers is determined by locating in said store its associated directory number, means responsive to said request for retrieving from said store the manifestation associated with said selected called number including means for searching said store for selected called number , and means for operating said announcement machine to return an audio announcement to said calling line; radio signal transmission circuitry; and means under control of said intercept means for operating said radio signal transmission circuitry to transmit said retrieved manifestations.

2. In a telephone switching system according to claim 1 wherein said last mentioned means includes a signal generator connectable under control of said intercept means to said radio signal transmission circuitry.

3. A telephone switching system comprising one or more offices having a plurality of distinct directory numbers, intercept means including file store means operative incident to the interception of a call to a selected one of said directory numbers and in response to a request for intercept service, said request including said selected directory number, said intercept means being operative for providing data relative to said selected directory number, transmitter means, and means for operating said transmitter means in accordance with said data provided by said file store means, whereby a signal is transmitted to a receiver associated with said selected directory number.

4. A telephone switching system according to claim 3 further comprising audio announcement means operative in accordance with said data provided by said file store means for generating an announcement relative to said call.

5. In a telephone switching system including means for intercepting calls to selected directory numbers and for providing an audio message to the calling party; said intercepting means including trunk circuit means for receiving intercepted calls, means for storing information relative to said selected directory numbers, means utilizing the directory number of an intercepted call for retrieving information from said storing means selectively in accordance with said directory number, and means for generating an audio message in accordance with information retrieved from said storing means and for providing said audio message over said trunk circuit means to the calling party; means for providing personal signaling service relative to predetermined ones of said selected directory numbers comprising, radio signal transmission means, and means responsive to the receipt of an intercepted call to one of said predetermined directory numbers for operating said intercepting means to enable said radio signal transmission means in a manner determined by information retrieved from said storing means in accordance with said directory number of said intercepted call.

* * * * *